July 12, 1949.　　　　O. WITTEL　　　　2,476,013
RANGE FINDER LIGHT DEVIATING MEANS
Filed Feb. 9, 1946　　　　　　　　　　3 Sheets-Sheet 1
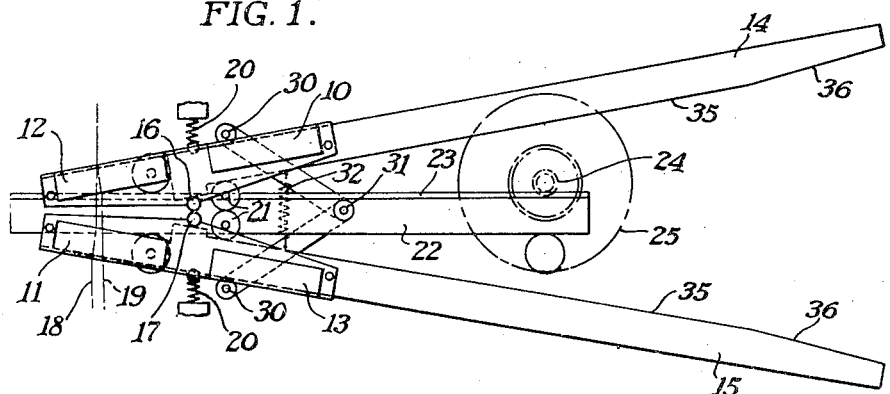
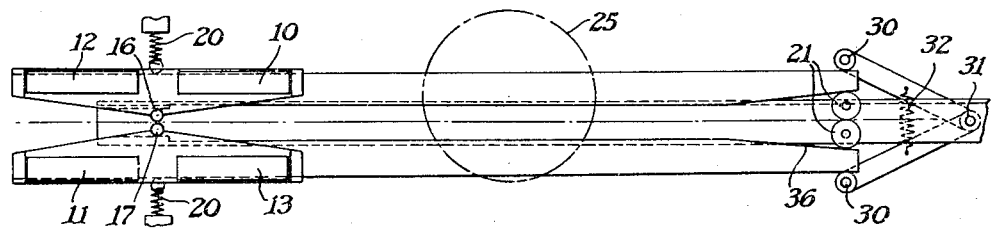
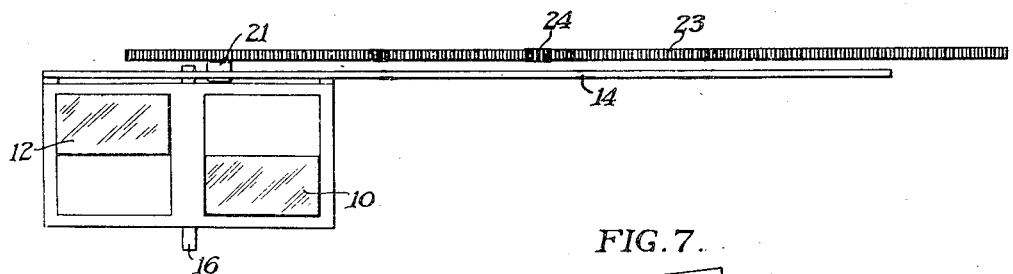
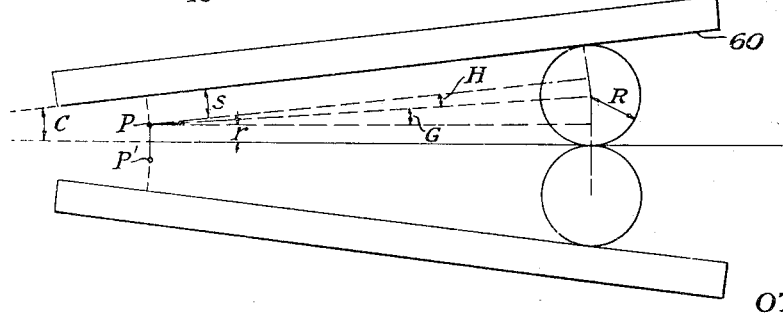
OTTO WITTEL
INVENTOR
BY Newton Perrins
F. M. Emerson Holmes
ATT'Y & AG'T July 12, 1949.  O. WITTEL  2,476,013
RANGE FINDER LIGHT DEVIATING MEANS
Filed Feb. 9, 1946  3 Sheets-Sheet 2

OTTO WITTEL
INVENTOR
BY
ATT'Y & AG'T

July 12, 1949.  O. WITTEL  2,476,013
RANGE FINDER LIGHT DEVIATING MEANS
Filed Feb. 9, 1946  3 Sheets-Sheet 3

OTTO WITTEL
INVENTOR
BY
ATTORNEYS

Patented July 12, 1949

2,476,013

UNITED STATES PATENT OFFICE 2,476,013

RANGE FINDER LIGHT DEVIATING MEANS

Otto Wittel, Rochester, N. Y., assignor to Eastman Kodak Company, Rochester, N. Y., a corporation of New Jersey Application February 9, 1946, Serial No. 646,683

4 Claims. (Cl. 88—2.7)

This invention relates to range finders and specifically to light deviating means for use in range finders.

It is applicable to various types of range finders such as coincidence type, stero type, and ortho-pseudo stereo type. It is particularly useful in the ortho-pseudo stereo range finder described in my copending application Serial No. 646,682 filed concurrently herewith.

It is the object of the present invention to provide means for deviating a light beam very precisely in accordance with the adjustment of some member. It is an advantage to have a ranging mechanism in which the adjustment is linear with range, especially since common forms of gun directors require such a linear arrangement with respect to the range data fed into the director computing mechanism. Therefore, it is a special object of the present invention to provide a light deviating means in which the ranging adjustment has a linear response with respect to range. This linear response is converted directly to angular rotation of a disc or wheel and the linearity is referred to as an "equi-crescent" sensitivity.

According to the present invention, the ranging device consists of one or more glass blocks or plates with plano-parallel sides which are rotatably mounted in a non-collimated light beam in the range finder. The most convenient location for such a plate is in the converging light from at least one of the objectives used in focusing the light from the target. The plano parallel plate is held approximately orthogonal to the beam at infinity setting and is mounted to be rotatable only through a small angle. The rotation is about an axis which is effectively perpendicular to the ranging plane, which plane is defined as the one containing the target and the base of the range finder. The axis is referred to as being effectively perpendicular to the ranging plane because the design of the range finder may involve a number of reflections so that the axis of the light beam is not in the ranging plane itself. In simple forms of range finders, this axis is actually as well as effectively perpendicular to the ranging plane. It may be a fixed axis but is preferably only approximately fixed, being actually a very small roller, rolling on a straight edge (or on another roller). The term "approximately stationary axis" is used to refer to both such small rollers and to an actually stationary pivot line. The support for the rotating plate is a long arm and includes a straight edge effectively in or parallel to the ranging plane and passing close to the axis of rotation. The arm and plate are rotated together by movement of a spacer which engages this straight edge and separates it from a reference line also effectively in or parallel to the ranging plane. Movement of the spacer along the straight edge changes the angle between the straight edge and the reference line. The straight edge is parallel to the reference line only at infinity setting. In embodiments of the invention in which two plates are used rotating in opposite directions in the right and left viewing point light beams, the spacer is arranged between two such straight edges which are respectively responsible for the rotation of the two glass plates. The reference line then bisects the angle between the two straight edges. The orientation of the straight edge with respect to the reference line is controlled by moving the spacer substantially radially toward and away from the axis of rotation and along the straight edge.

In my copending application, there are four more or less juxtaposed beams forming a right and a left viewing point image in each of the right and left eyepiece image planes. In this embodiment four glass plates are used, one in each beam, the ones in the left viewing point beams being carried by one arm of the rotating mechanism and the ones in the right viewing point beam being carried by the other arm, which arms are pivoted about a substantially common axis and are separated by rollers engaging a straight edge on each arm. Since the linearity of the response is necessary only over some specified range, say 500 to 20,000 yards, the straight edge is modified between 20,000 yards and infinity setting to allow the plates to be adjusted with relatively little movement between these two settings. Otherwise, infinity would be reached only when the spacer or rollers is moved an infinite distance from the axis.

The operation of the invention and the theory thereof will be fully understood from the following description when read in connection with the accompanying drawings in which:

Fig. 1 is a plan view of a light deviating device according to the invention for use in an ortho-pseudo stereo range finder, the orientation of the parts being that for close targets.

Fig. 2 shows the same device adjusted for "infinity".

Fig. 3 is an elevation view of the device shown in Figs. 1 and 2.

Fig. 7 similarly illustrates an improved form of the invention in which second order discrepancies from true linearity are eliminated.

Figure 8:
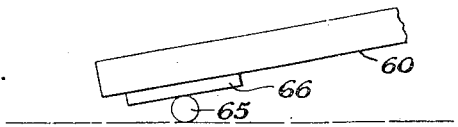

Fig. 8 shows the modification of Fig. 6 necessary to apply the correction discussed in connection with Fig. 7.

Figure 5:
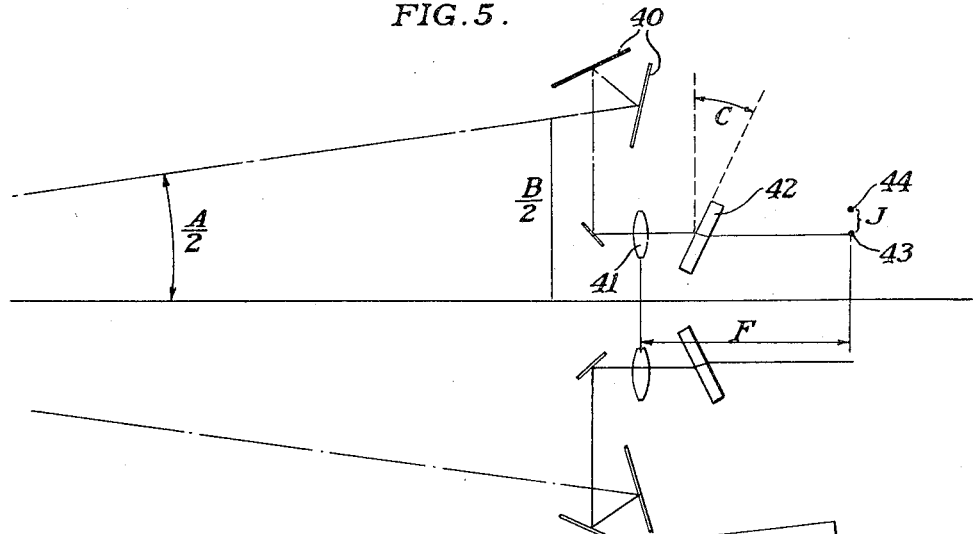
Figure 9:
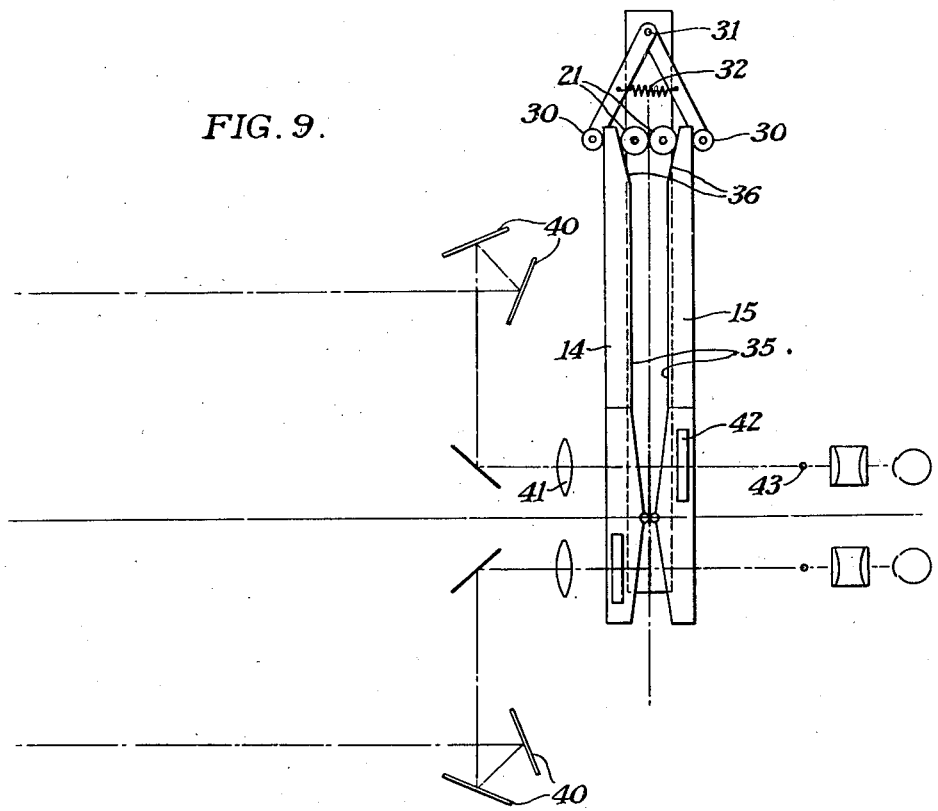

Fig. 9 shows the embodiment of the invention of Fig. 2 applied to the simple stereo range finder of Fig. 5.

In Figs. 1, 2 and 3, which specifically apply to the ortho-pseudo stereo range finder described in my copending application filed concurrently herewith and referred to above, the four convergent light beams are grouped in pairs one above the other en route to the left and right eyes, respectively. The two beams which came from the right viewing point of the range finder (which is not shown since the present invention relates only to the light deviating means and is applicable to any of the standard optical range finders) pass respectively through glass plates 10 and 12. The beam through the plate 12 goes to the upper half of the left eye field, and the one through plate 10 goes to the lower right eye field. Similarly, the two beams from the left viewing point pass through plates 11 and 13, respectively, in line with the lower left eye field and upper right eye field. Thus, this preferred form of the invention as applied to ortho-pseudo range finders simultaneously adjusts all four beams to eliminate any symmetrical errors, but the invention is applicable to a pair of glass plates or even to a single glass plate in one beam of a range finder. The beams do not have to be parallel, but the plates must be orthogonal to the beams at infinity setting. The plates 10 and 12 are carried on an arm 14 rotatable about an axis or roller 16. This axis 16 is effectively perpendicular to the ranging plane. Similarly, plates 11 and 13 are carried by an arm 15 rotatable about an axis or roller 17. Actually, 16 and 17 are rollers which are held in contact by the force of springs 20 engaging the outside of the arms 14 and 15, so that these arms actually rotate about axes which are offset from the center of the rollers 16 and 17 but which are nevertheless perpendicular to the ranging plane which is the important point. Two light beams 18 and 19 coming from the front which is the top in Fig. 1 are separated in opposite directions. The beam 18 is below the beam 19 and does not strike the plate 12 but is offset to the left by the plate 11 as shown. The beam 19 is offset to the right by the plate 12 and then passes above the plate 11.

The arms 14 and 15 are, according to the present invention, provided with straight edges 35 which engage rollers or spacers 21. These rollers 21 are carried by a member 22 having a rack 23 along the one side thereof which engages a pinion 24. Rotation of the pinion 24 by rotating the ranging knob 25 causes the member 22 to move which rolls the rollers 21 along the straight edges 35. To insure maintenance of contact between the straight edges 35 and the rollers 21, spring urged members 30 pivoted at the point 31 and held by the spring 32, engage the outside of the arms 14 and 15, holding the arms together. Thus, as the member 22 and rollers 21 are moved to the right in Figs. 1 and 2, the arms 14 and 15 swing toward each other reducing the angle between the plates 11 and 12. As will be explained later, this arrangement gives linear response with respect to range, but would require the spacers 21 to be moved an infinite distance to the right to reach the infinity setting. Therefore, the edges 35 are straight only over the useful range, for example 500 yards to 20,000 yards for certain types of instruments, and then the scale is condensed beyond this upper limit (20,000 yards) to infinity by the tapered sections 36 of the otherwise straight cam. It will be noted that the arrangement shown in these figures has the pivot rollers 16 and 17 offset slightly from the straight edge 35 in accordance with the preferred embodiment of the invention to be discussed later in connection with Figs. 7 and 8.

The theory of the invention will now be discussed. The problem which was solved by the present invention was primarily that of obtaining a ranging mechanism in which the motion of some part is directly proportional to the range. According to the present invention, there is constructed within the range finder a small model of the range triangle, i. e. the triangle formed by the base of the range finder and the target as the apex, in which model the parallactic angle is magnified perhaps 50 or 100 times. The parallel glass plates discussed above are carried on the sides of the small triangle to shift the images by the amount necessary for ranging adjustment. That is, the adjustment gives stereo contact in an ortho-pseudo stereo range finder or coincidence in a coincidence range finder. From a manufacturing point of view there is considerable advantage in the fact that the necessary parts providing this model of the ranging triangle are all very simple, consisting of parallel plates, straight edges and rollers. It will be shown first that such an arrangement in its simplest form is quite a satisfactory approximation but for very precise work the presence of secondary errors, particularly in the shorter ranges, are objectionable. Even these second order errors can be reduced to an absolutely negligible amount over the important part of the range scale by simple modification descussed in connection with Figs. 7 and 8 below.

Figure 4:
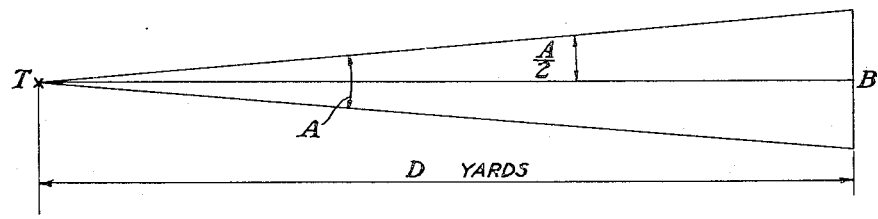
Figs. 4 and 5 illustrate the principle of the simplest form of the invention.

Fig. 4 is to represent the range triangle in which the target T is at a distance D from the range finder whose base is length indicated as B. The parallactic angle is A and $$\frac{A}{2} = \tan^{-1}\left(\frac{B}{2D}\right)$$

which equals B/2D to an approximation that is much better than is necessary as far as the ranging problem is concerned. This approximation is not a source even of the secondary errors to be discussed later.

Since the form of range finder shown in Fig. 5 is completely symmetrical, one-half only need be considered although both halves are shown. The light from the right viewing point 40 of the range finder is directed toward the center of the instrument and is reflected through an objective 41 which forms an image of the target at the point 43, a distance F from the lens 41. A plano parallel plate according to the invention is mounted in the convergent beam and is rotated from the orthogonal position through an angle C which offsets the target image a distance J in the image plane. That is, the image would be at the point 44 were it not for the tilting of the plate 42. In the figure, the degree of tilt of the plate 42 is that which brings the image to the point 43 which happens to be the location of the image of the target at infinite distance if the plate 42 were not present or if it were orthogonal to the light beam. Ranging consists in rotating the plate 42 until the angular displacement of the image is equal to A/2 at which time one has coincidence or stereo contact. This angular displacement of the image equals $$\tan^{-1}\left(\frac{J}{F}\right)$$

which in turn equals $J/F$ to the same approximation as discussed above in connection with the angle A/2. Thus at coincidence or stereo contact $$\frac{B}{2D} = \frac{J}{F}$$

The displacement of the image by the parallel plate 42 is given by $$J = t \sin C\left(1 - \frac{\cos C}{\sqrt{n^2 - \sin^2 C}}\right)$$

where $t$ is the thickness of the plate and $n$ is the index of refraction. For small values of C, J becomes equal to $$t\left(\frac{n-1}{n}\right)C$$

Thus we have the mathematical expression relating $J$ to the angle $C$ which in turn is determined by the moving of the rollers between the straight edges of the present invention.

Fig. 9 shows the same range finder as Fig. 5 with the space adjusting mechanism shown in detail. This mechanism is identical with that shown in Fig. 2, except that only two glass plates are shown since the instrument is a simple stereo range finder rather than an ortho-pseudo one for which Fig. 2 is intended.

Figure 6:
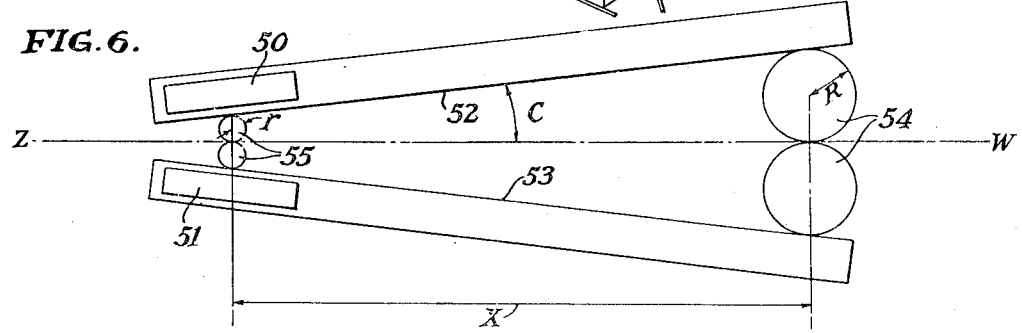
Fig. 6 illustrates such an embodiment applied to a range finder having two juxtaposed beams.

The manner in which the angle C is determined in practice is illustrated in Fig. 6, in which the plano parallel glass plates 50 and 51 are carried on supporting arms having straight edges 52 and 53. The straight edges are separated by two stationary rollers 55 of radii $r$ and two movable rollers 54 of radii R. The line between the centers of the rollers 55 and the one between the centers of the rollers 54 are both perpendicular to a reference line ZW lying effectively in the ranging plane. The distance between these two lines measured along the line ZW is the variable X which is to be linear in range. The angle C as indicated by the reference line ZW and the straight edge 52 is equal to $$\tan^{-1}\left(\frac{2(R-r)}{X}\right)$$

or to the first approximation $$C = \frac{2(R-r)}{X}$$

Looking back over the equations developed above, we find that $$\frac{B}{2D} = \frac{J}{F}$$

which equals $$\frac{t}{F}\left(\frac{n-1}{n}\right)C$$

which equals $$\frac{t}{F}\left(\frac{n-1}{n}\right)\frac{2(R-r)}{X}$$

Thus X is a linear function of the range at least as far as the approximation we made at developing the relationship between J and C and the relationship between C and X.

The error E introduced by these approximations will now be described. In range finding it is customary to define ranging as units of error and for practical purposes an error of 1/3 of a second as the change in the angle B can be taken as one unit of error. Expanding the sine and cosine terms where they appeared in the first equation relating J to the angle C, we note that $$J = t\left(C - \frac{C^3}{6} + \cdots\right)\left[1 - \frac{1 - \frac{C^2}{2} + \cdots}{n\left(1 - \frac{C^2}{2n^2} + \cdots\right)}\right]$$

$$\therefore J = t\left(\frac{n-1}{n}\right)\left(C + \frac{-n^2 + 3n + 3}{6n^2}C^3 + \cdots\right)$$

and the angular displacement of the image is given by:

$$\frac{t}{F}\left(\frac{n-1}{n}\right)\left(C + \frac{-n^2 + 3n + 3}{6n^2}C^3 \cdots\right)$$

In the preferred embodiment shown in Figs. 7 and 8, an offset of the axis of rotation is used (which differs slightly from that shown in Fig. 6). Assume that the two straight edges swing around two pivots P and P' which are fixed a constant distance S from the straight edges. Also let $r$ be the distance of these points P and P' from the reference line ZW. This difference between S and $r$ is accomplished in practice by the use of a step 66 on the straight edge 60 as shown in Fig. 8. $r$ is the radius of the roller 65. The mathematical problem is now to express the angle C as a function of X, S, R and $r$ and then to adjust the value of S and $r$ so that the errors cancel out for a reason to be explained below.

The angle C as shown in Fig. 7 is made up of two parts G and H $$G = \tan^{-1}\left(\frac{R-r}{X}\right) = \frac{R-r}{X} - \frac{1}{3}\left(\frac{R-r}{X}\right)^3 + \cdots$$

$$H = \sin^{-1}\left(\frac{R-S}{L}\right) = \sin^{-1}\left(\frac{R-S}{X}\cos G\right)$$

Where L is the distance from the pivot to the center of the movable roller $$\frac{X}{L} = \cos G = 1 - \frac{1}{2}\left(\frac{R-r}{X}\right)^2 \cdots$$

so that $$H = \sin^{-1}\left[\frac{R-S}{X} - \frac{1}{2}\frac{(R-S)(R-r)^2}{X^3}\right]$$

or $$H = \frac{R-S}{X} - \frac{(R-S)(R-R)^2}{2X^3} + \frac{(R-S)^3}{6X^3} + \cdots$$

$$C = G + H = \frac{R-S}{X} + \frac{R-r}{X} -$$

$$\frac{3(-S)(R-r)^2 - (R-S)^3 + 2(R-r)^3}{6X^3} + \cdots$$

$$= \frac{R-S+R-r}{X} -$$

$$\frac{1}{6}\frac{3(R-S)}{R-r} - \frac{(R-S)^3}{(R-r)^3} + 2}{\left(\frac{R-S}{R-r} + 1\right)^3}\left(\frac{R-S+R-r}{X}\right)^3 + \cdots$$

$$= \frac{R-S+R-r}{X} - \frac{1}{6}\frac{2 - \frac{R-S}{R-r}}{1 + \frac{R-S}{R-r}}\left(\frac{R-S+R-r}{X}\right)^3 + \cdots$$

$$= \frac{R-S+R-r}{X} - \frac{1}{6}\frac{R+S-2r}{2R-S-r}\left(\frac{R-S+R-r}{X}\right)^3 + \cdots$$

Putting this value of C into the expression for the angular displacement of image, we get:

$$\frac{t}{F}\left(\frac{n-1}{n}\right)\left[\frac{R-S+R-r}{X} - \frac{1}{6}\frac{R+S-2r}{2R-S-r}\left(\frac{R-S+R-r}{X}\right)^3 + \frac{-n^3+3n+3}{6n^3}\left(\frac{R-S+R-r}{X}\right)^3 + \cdots\right]$$

In this expression, the error E is defined by the two cubic terms inside the bracket. It will be noted that the coefficients of the cubic terms are of opposite sign; hence, they can be made equal in magnitude thereby cancelling so that this order error will vanish. For this to be true, $$\frac{R+S-2r}{2R-S-r} = \frac{-n^2+3n+3}{n^2}$$

This is a complete solution which can be applied directly in practice by substituting actual values.

Errors proportional to the fifth power of $$\frac{(R-S)+(R-r)}{X}$$

still remain. The magnitude of these fifth order errors can be calculated by the same method as used for the cubic terms. However, the fifth order error in practice is quite negligible.

I have found it expedient to use a sixty times magnification of the parallactic angle. This requires that $$\frac{R-S+R-r}{X} = 60\left(\frac{A}{2}\right)$$

which as shown above equals $$30\frac{B}{D}$$

For a base length of 3 yards and a value of X equal to 10 inches when D equals 20,000 yards:

$$R-S+R-r = \frac{30 \times 3 \times 10 \text{ inches}}{20,000} = .045 \text{ inch}$$

When the index of refraction of the glass block=1.550, $$\frac{R+S-2r}{2R-S-r} = \frac{-n^2+3n+3}{n^2} = 2.1818$$

When R=.250 inches, these two simultaneous equations solved for r and S give:

$$S = 0.252763 \text{ inch}$$

and $$r = 0.202237 \text{ inch}$$

Which in turn means that the thickness of the offset step or the straight edge should be .050526 inch. With this set up, the error even at close range, say 1,000 yards, is only 0.024 units of error, which is negligible. Thus theory verifies my findings that an equi-crescent ranging mechanism can be made by rotating two parallel glass plates in the converging beams of light back of the objectives, provided the rotation of the glass plates is determined by two pair of rollers, one stationary and one movable. The motion of the movable pair of rollers is proportional to the range. The deviation of the light between glass plates is not exactly proportional to their rotation nor is their rotation exactly proportional to the motion of the movable pair of rollers. These two errors are made to neutralize each other almost exactly by placing thin fixed shims under the rollers. With this added refinement, the motion of the movable rollers is equi-crescent with range within vanishingly small limits. With the values just now described, rotation of the arms through 10 degrees of arc is equivalent to a change of 10 minutes of arc in the parallactic angle.

As my invention I claim:

1. A light deviating device in a converging, image-forming, light beam of a spaced viewing point range finder, comprising a plano parallel transparent plate of light refractive material, means for supporting the plate an at angle to orthogonality with the light beam inversely proportional to the range setting of the finder and means for rotating the plate and supporting means through a small angle about an approximately stationary axis effectively perpendicular to the ranging plane of the finder, said rotating means including a straight edge effectively parallel to the ranging plane and passing close to and at a distance from said axis, a movable spacer whose spacing width is greater than said distance engaging said straight edge to hold it at an angle to a reference line in the same plane and also close to said axis, and means for moving said spacer along said reference line substantially radially to and from said axis to vary said angle.

2. A light deviating device according to claim 1 for use in a range finder having two converging beams, one from the right viewing point and the other from the left viewing point at the ends of the range finder base comprising in addition to said plano parallel transparent plate in one beam, a similar plate in the other beam, each plate having a support with a straight edge and the spacer engaging both straight edges and movable therealong to vary the angle between the straight edges, the reference line being the line which bisects the angle between said edges.

3. A light deviating device according to claim 1, particularly for use in an ortho-pseudo stereo range finder having four converging beams, one from the left viewing point and one from the right viewing point being juxtaposed and going toward a left eye image plane and one from each viewing point similarly going to the right eye viewing plane, comprising in addition to said plano parallel transparent plate, three similar plates one in each of the other three beams, the two plates in the right viewing point beams being carried by one support and the two plates in the left viewing point beams being carried by another support, each of the supports having a straight edge and the spacer engaging both straight edges and movable therealong to vary the angle between the straight edges.

4. A light deviating device according to claim 1 in which the spacer is a roller rolling along the straight edge and the axis of rotation is defined by a fixed roller one side of which is approximately in line with the straight edge and the other side of which osculates the reference line.

OTTO WITTEL.

REFERENCES CITED

The following references are of record in the file of this patent:

UNITED STATES PATENTS

| Number | Name | Date |
|---|---|---|
| 588,094 | Searle et al. | Aug. 10, 1897 |
| 1,370,530 | Fouasse | Mar. 8, 1921 |
| 1,497,235 | Godillon | June 10, 1924 |
| 1,508,585 | Wild | Sept. 16, 1924 |
| 1,703,386 | Boykow | Feb. 26, 1929 |
| 2,398,193 | Strang et al. | Apr. 19, 1946 |

FOREIGN PATENTS

| Number | Country | Date |
|---|---|---|
| 378,626 | Great Britain | Aug. 18, 1932 |

Certificate of Correction

Patent No. 2,476,013                                             July 12, 1949

OTTO WITTEL

It is hereby certified that error appears in the printed specification of the above numbered patent requiring correction as follows:

Column 6, line 60, for that portion of the equation reading "$3(-S)$" read $3(R-S)$; and that the said Letters Patent should be read with this correction therein that the same may conform to the record of the case in the Patent Office.

Signed and sealed this 14th day of March, A. D. 1950.

[SEAL]

THOMAS F. MURPHY,
*Assistant Commissioner of Patents.*